United States Patent Office 3,037,953
Patented June 5, 1962

3,037,953
CONCENTRATION OF AQUEOUS COLLOIDAL DISPERSIONS OF POLYTETRAFLUOROETHYLENE
Barnard Mitchel Marks, Wilmington, Del., and George Henry Whipple, Orange, Tex., assignors to E. I. du Pont de Nemours and Company, Wilmington, Del., a corporation of Delaware
No Drawing. Filed Apr. 26, 1961, Ser. No. 105,533
5 Claims. (Cl. 260—29.6)

This invention relates to a process for concentrating dispersions of polytetrafluoroethylene, and, more particularly, it relates to a process for quickly concentrating aqueous, colloidal dispersions of polytetrafluoroethylene without the formation of coagulum.

This application is a continuation-in-part of our copending application Serial No. 772,416, filed November 7, 1958, now abandoned, which, in turn, was a continuation-in-part of our copending application Serial No. 631,392, filed December 31, 1956, now abandoned, which, in turn, was a continuation-in-part of our application Serial No. 356,584, filed May 21, 1953, now abandoned, and which, in turn, was a continuation-in-part of our application Serial No. 348,116, filed April 10, 1953, now abandoned.

Aqueous dispersions of polytetrafluoroethylene are commercially available at various concentrations, although the most common is approximately 30% to 45% solids. Such dispersions can be made, for example, according to the processes described in U.S. Patent 2,534,058 issued to Malcolm M. Renfrew December 12, 1950, U.S. Patent 2,559,749 issued to Anthony F. Benning July 10, 1951, and U.S. Patent 2,559,752 issued to Kenneth L. Berry July 10, 1951, in which polyfluorinated salts, including the perfluorinated salts as well as the related salts which are highly, but not completely fluorinated, are employed as ionic dispersing agents. Dispersions with a concentration level of 30% to 45% solids are usefully employed in many applications; however, many of the same applications, as well as other embodiments, find it advantageous to utilize dispersions of a higher concentration than 45%. For example, in the field of coating or impregnating other materials by dipping, brushing, or spraying followed by evaporation of the continuous phase of the dispersion, it may be economical to use a highly concentrated dispersion and thereby increase the amount of solids applied to the substrate in one coating application. There are many materials which are sensitive to water and other liquids, such that it is desirable to decrease the time during which the sensitive material is in contact with the liquid. It would therefore be advantageous to utilize a highly concentrated dispersion in such a case, if the sensitive material were to be treated with a dispersion, and thereby minimize the time of contact. For example, if water-sensitive paper is to be treated with an aqueous dispersion of polytetrafluoroethylene so as to coat the paper, it is advantageous to utilize a concentrated dispersion and thus minimize the time during which the paper is in contact with water. Moreover, it is more economical to use concentrated dispersions because of the decrease in operating time for a process utilizing such a dispersion, as well as requiring less space to store and ship such dispersions.

Procedures for concentrating aqueous dispersions of polytetrafluoroethylene may be found in U.S. Patent 2,478,229 issued August 9, 1949, to K. L. Berry. This patent describes several methods whereby the dispersing agent in the original dilute dispersion is rendered inactive so as to permit the dispersed polymer particles to flocculate or, in other words, to form larger size particles than in the original dispersion. The flocculated particles, being heavier than water, settle into a concentrated non-fluid layer, and the supernatant liquid is then removed. It is then stated that the flocculated particles may be redispersed by peptizing the inactive dispersing agent. This Berry patent teaches three procedures to affect the concentration, namely (1) the addition of an acid to cause flocculation followed by neutralization of the acid to permit redispersion of the flocculated particles, (2) the addition of a water-soluble salt to a dispersion containing an ionic surface-active agent to cause the surface-active agent to precipitate and, thereby, to permit the dispersed particles to flocculate and settle, followed by reducing the salt concentration (e.g. by volatilizing the dissolved salt) to permit the flocculated particles to redisperse, and (3) the heating of a dispersion containing a non-ionic surface-active agent to cause the surface-active agent to insolubilize and, thereby, permitting the dispersed particles to flocculate and to settle, followed by cooling to resolubilize the surface-active agent causing the flocculated particles to redisperse. While these procedures performed well in the concentration of relatively dilute (1%–5% by weight of solids) dispersions of polytetrafluoroethylene, it has been found that modifications of these procedures are necessary to concentrate the polytetrafluoroethylene dispersions of today, which, in their dilute condition, contain 30%–45% of solids. Such concentrated dispersions were not available to Berry at the time of his invention relating to methods of concentrating, and more recent methods of polymerizing tetrafluoroethylene have made it possible to obtain colloidal dispersions of about 30%–45% by weight solids, which can, in turn, by the process of this invention be further concentrated to 55%–75% by weight of solids. The dilute aqueous dispersions of today are made by the processes of the Berry Patent U.S. 2,559,752 and contain about 0.2%–0.4% of an ammonium polyfluorocarboxylate (based on the weight of polymer solids) as a dispersing agent. It is this dispersion which is employed as the starting material of the process described and claimed herein.

If the concentration procedures of Berry U.S. 2,478,229 are applied to this dilute aqueous dispersion (30%–45% solids and containing 0.2%–0.4% ammonium polyfluorocarboxylate) the dispersion does not concentrate as taught by Berry, and this is apparently due to a combination of such factors as (1) the presence of the ammonium polyfluorocarboxylate, which is an ionic material, (2) the strong tendency for the colloidal particles of polytetrafluoroethylene to coagulate (i.e. to agglomerate irreversibly, thereby unalterably destroying the colloidal nature of the dispersion), and (3) the greater concentration of the dilute dispersion causing the concentrating procedure to be a more delicate operation. These factors are so important that the addition of a water-soluble salt to a colloidal dispersion of polytetrafluoroethylene, whether that dispersion contains ammonium polyfluorocarboxylate or not, causes the dispersed particles to coagulate. If the concentrating procedures of the Berry Patent 2,478,229, which involve the addition of an acid or the addition of a salt to a dispersion containing an ionic surface-active agent, are employed, coagulation of the colloidal particles occurs. Theoretically, it might be possible to add an exact amount of acid or the combination of ionic surface-active agent and a salt which would permit concentration with a minimum of coagulation, but practically it has been found to be impossible to attain such a fine balance in a commercial operation. Furthermore, when such dispersions are employed to produce electrical insulation, residues of the ionic or acid materials reduce the dielectric constant of the insulation to such an extent that the quality of the insulation is too poor for commercial utility. The Berry procedure, involving the addition of a non-ionic surface-active agent to the dilute dispersion followed by steps of heating and cooling, produces some concentration but, depending upon the characteristics of the particular dispersion being concentrated and upon the manner in which the concentration is carried out, the Berry process may take as much as 100 times as long to reach the same concentration as the present process, while in some instances it appears that the ultimate concentration that can be reached by the Berry process is less than that which is desired, i.e. 55%–75% by weight of solids.

It has also been observed that when the concentrated dispersions of polytetrafluoroethylene are cast into films, some dispersions are capable of producing relatively thick, void-free continuous films, while others contain voids and cracks throughout the film unless the film is considerably thinner. Unexplainably, the dispersions concentrated by the Berry process cannot be cast into films that are free of cracks and are as thick as is the case with the product of this invention.

It is an object of this invention to provide a novel method for concentrating an aqueous dispersion of polytetrafluoroethylene containing a polyfluoro salt as a dispersing agent. It is another object of this invention to concentrate such an aqueous dispersion of polytetrafluoroethylene without the formation of any coagulum at any time during the concentrating procedure. It is another object of this invention to concentrate such a dispersion in the shortest time possible, which may be a matter of minutes or a few hours. It is another object of this invention to provide a process for preparing a concentrated dispersion of polytetrafluoroethylene which can be cast into crack-free films. Other objects will be apparent to those skilled in the art of making polymeric dispersions.

The above objects may be accomplished by a process which consists essentially of the steps of (1) forming a mixture by adding to an aqueous colloidal dispersion of particles of polytetrafluoroethylene containing 30%–50% by weight of polymer solids and containing 0.2%–0.4%, based on the weight of said solids, of an ammonium polyfluorocarboxylate having 7–10 carbon atoms per molecule, 0.01% to 1.0% by weight of said dispersion of a member of the group consisting of sodium hydroxide, ammonium hydroxide, and ammonium carbonate, and 6%–12% by weight of said solids of a non-ionic surface-active agent selected from the group of compounds having the formula

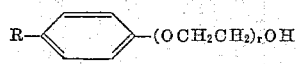

and

wherein R is a monovalent hydrocarbon radical of 8–10 carbon atoms, $r$ is a positive number having a value equal to 1 to 2 more than the number of carbon atoms in R, $n$ is a positive integer of from 12–18, and $m$ is a number having the value of from $$\frac{5n}{6} - 6 \text{ to } \frac{2n}{3} + 1$$

(2) heating said mixture to a temperature of 50°–80° C. until said non-ionic, surface-active agent begins to insolubilize as indicated by a cloudy appearance in said mixture, and said particles settle to form in said mixture a lower layer containing the polymer solids and a substantially clear upper layer; (3) decanting said upper layer; (4) reducing the temperature of said mixture to about room temperature; and (5) recovering said lower layer as an aqueous colloidal dispersion of particles of polytetrafluoroethylene having a concentration of 55%–75% by weight of solids and being free of irreversibly coagulated polytetrafluoroethylene particles. In one of the preferred embodiments of this process the above objects are accomplished by starting with an aqueous colloidal polytetrafluoroethylene dispersion containing 30%–40% by weight of solids and 0.2%–0.4% by weight of the said solids of ammonium perfluorocaprylate. To this dispersion there is added 6–12% by weight of "Triton" X-100 which is a polyethylene oxide ether of octyl phenol having the general formula:

and sometimes named "polyethylene glycol mono-para-octylphenyl ether," and 0.01%–1.0% by weight of the dispersion of sodium hydroxide, ammonium hydroxide, or ammonium carbonate. The remainder of the process steps are the same as those above, in that the dispersion is heated, decanted, and cooled to produce the concentrated dispersion.

In the present process the use of a non-ionic surface-active agent, which is a polyethylene glycol ether having certain inverse solubility characteristics, is important in causing the concentration to occur without the danger of coagulation. Thus, the original colloidal size of 0.05 to 0.5 micron is retained as the size of the polymer particles in the concentrated product. In some unknown manner the polyethylene glycol ether protects the particles of polytetrafluoroethylene while the electrolyte, in the form of sodium hydroxide, ammonium hydroxide or ammonium carbonate, is neutralizing the electrostatic charges in the dispersion, presumably from the ammonium polyfluorocarboxylate used in the polymerization step. As soon as these charges are neutralized, the polymer particles move closer to each other and would coagulate were it not for the presence of the polyethylene glycol ether. At temperatures in the range of 50°–80° C. the ether becomes insoluble and seems to form tiny droplets giving the dispersion a cloudy appearance, and it is believed that these droplets form a nucleus around which the polymer particles assemble during the sedimentation step. When the temperature is lowered to room temperature the droplets disappear as the ether dissolves. The electrolyte neutralizes the charge, which is due to the presence of the ammonium polyfluorocarboxylate, and thereby permits the concentration step to proceed with much greater speed. The relative speeds of concentration which are involved are that the use of electrolyte permits the concentration to occur up to 100 times faster than the same process without an electrolyte.

The following examples are provided to demonstrate the operation of this process, and to describe its features in a more detailed manner. In each example the starting material is a dilute dispersion containing as an ionic dispersing agent the ammonium salt of a polyfluoroalkanoic acid, as described in U.S. Patent 2,559,752. Parts and percentages are by weight unless otherwise specified.

*Example 1*

The starting material was an aqueous dispersion of colloidal polytetrafluoroethylene particles, the dispersion containing 48% solids content. To 100 ml. of the starting dispersion at 80° C., there was added 9% of "Triton" X-100, based on the weight of the polymer, and the composition was mixed well. Then lead acetate was added in various amounts indicated below, and the mixture held at 80° C. to permit the concentrating action to take place. Supernatant liquid was decanted and the following effects were obtained:

(a) 0.02 gram of lead acetate caused a concentration of 62% solids to form in less than an hour.
(b) 0.05 gram of lead acetate caused a concentration of 75% solids to form in less than an hour.
(c) 0.10 gram of lead acetate caused a concentration of 57% solids to form in less than an hour.
(d) 0.15 gram of lead acetate caused a concentration of 52% solids to form in less than an hour.
(e) 0.65 gram of lead acetate caused no concentration in two hours.

Examples 2–9

In the following table there is a summary of a series of runs in which a dilute dispersion of colloidal polytetrafluoroethylene particles, having 0.2%–0.4% by weight of an ammonium polyfluorocarboxylate in the dispersion as a dispersing agent, is concentrated by treatment with a non-ionic surface-active agent and an electrolyte, followed by the steps of heating, decanting and cooling. In each of these examples the non-ionic, surface-active agent is "Triton" X–100, and it is used in the amount of 9% by weight of the polymer solids. The dispersion is then mixed, heated to the indicated temperature for the indicated time, decanted, and cooled to room temperature to recover a dispersion concentrated to the amount indicated.

| Example | Percent by Weight of Polymer Solids in Starting Dispersion | Electrolyte Added | Percent of Electrolyte Based on Weight of Dispersion | Temperature to which Dispersion is Heated, °C. | Time required for Concentration | Percent by Weight of Polymer Solids in Final Dispersion |
|---|---|---|---|---|---|---|
| 2 | 47 | Calcium chloride. | 0.04 | 80 | 35 min | 60 |
| 3 | 47 | Barium chloride. | 0.06 | 80 | 16 min | 63 |
| 4 | 47 | Ammonium chloride. | 0.04 | 80 | 30 min | 63 |
| 5 | 50.7 | Ammonium carbonate. | 0.04 | 80 | 12 min | 72 |
| 6 | 44 | Ammonium hydroxide. | 0.36 | 75 | 1.0 hr | 68 |
| 7 | 42 | ----do---- | 0.36 | 79 | 1.0 hr | 66 |
| 8 | 30 | ----do---- | 0.40 | 78 | 35 min | 70 |
| 9 | 30 | ----do---- | 0.40 | 74 | 40 min | 70 |

Example 10

To an aqueous, colloidal dispersion of polytetrafluoroethylene containing 35% solids there were added 19.76 ml. of $H_2O$ per 100 ml. of dispersion, 9% based on the weight of the polymer of a polyethylene glycol alkyl ether (comprised substantially of $C_{18}H_{35}(OC_2H_4)_{10}OH$, an ethylene oxide adduct of oleyl alcohol), and 0.18% by weight of the dispersion of concentrated ammonium hydroxide. The composition was mixed well at 75° C. and allowed to stand at this temperature for 1½ hours, at the end of which time the supernatant liquid was decanted and the remainder cooled to give a colloidal dispersion of 67% solids.

Example 11

To an aqueous, colloidal dispersion of polytetrafluoroethylene containing 35% solids there were added 19.76 ml. of $H_2O$/100 ml. dispersion, 9% based on the weight of the polymer of a polyethylene glycol alkyl ether (the ethylene oxide adduct of a commercial mixture of aliphatic alcohols, about ⅓ cetyl alcohol and ⅔ stearyl alcohol, the adduct containing about 10 moles of ethylene oxide per mole of alcohol), and 0.36% by weight of the dispersion of concentrated ammonium hydroxide. The water was added to bring the resulting solids content to 30%, but is not necessary in the process. The composition was mixed well at 66° C., and was allowed to stand at this temperature for 1⅔ hours, at the end of which time the supernatant liquid was decanted and the remainder cooled to give a colloidal dispersion of greater than 68% solids.

Example 12

To an aqueous, colloidal dispersion of polytetrafluoroethylene containing 39% solids there were added 32.64 ml. $H_2O$ per 100 ml. of dispersion, 9% based on the weight of the polymer of a polyethylene glycol alkyl ether (comprised substantially of $C_{12}H_{25}(OC_2H_4)_{7.5}OH$, an ethylene oxide adduct of lauryl alcohol, and 0.35% by weight of polymer solids of concentrated ammonium hydroxide. The composition was mixed well at 65° C. and allowed to stand at this temperature for 35 minutes, at the end of which the supernatant liquid was decanted and the remainder cooled to give a colloidal dispersion of greater than 69% solids.

Example 13

To an aqueous colloidal dispersion of polytetrafluoroethylene containing 31% solids there were added 12% based on the weight of the polymer of a polyethylene glycol alkyl ether (comprised substantially of $C_{12}H_{25}(OC_2H_4)_4OH$, an ethylene oxide adduct of lauryl alcohol), and 0.35% by weight of said dispersion of ammonium carbonate. The composition was mixed well at 52° C. and allowed to stand at this temperature for 2 hours, at the end of which the supernatant liquid was decanted and the remainder cooled to give a colloidal dispersion of greater than 65% solids.

Example 14

To an aqueous colloidal dispersion of polytetrafluoroethylene containing 35% solids there were added 19.76 ml. of $H_2O$ per 100 ml. of the dispersion, 9% based on the weight of the polymer of a mixture of equal parts by weight of two polyethylene glycol alkyl ethers ($C_{18}H_{37}(OC_2H_4)_6OH$ and $C_{18}H_{37}(OC_2H_4)_{20}OH$), and 0.72% by weight of said dispersion of concentrated ammonium hydroxide. The composition was mixed well at 63° C. and allowed to stand at this temperature for 1½ hours, at the end of which time the supernatant liquid was decanted and the remainder cooled to give a colloidal dispersion of 64% solids.

In all of the examples given above the concentrated product dispersion is free-flowing, with the polymer completely dispersed, in a colloidal particle size of 0.05 to 0.5 micron, and containing no coagulated material. The viscosity of the product dispersion is from about 10 to about 20 cps.

The electrolytes used in the process of this invention are important in that their use has permitted a concentrating action to take place in a half to a hundredth of the time required to accomplish the same result by methods known heretofore. Furthermore, the use of an electrolyte eliminates the necessity of maintaining a delicate control over the time-temperature relationships of this process.

The electrolytes known to be operable in the process of concentrating polytetrafluoroethylene dispersions include any base or any salt which ionizes in the dispersion. There are many reasons why it is desirable to choose one compound over another for use as the electrolyte of this process. In some instances it is important not to employ a non-volatile electrolyte. When a polytetrafluoroethylene dispersion containing a non-volatile electrolyte is used in the preparation of a shaped article which must be sintered in order to fuse the polymer particles, the non-volatile material remains in the coating as an impurity. The presence of these impurities can lead to undesirable results, if the polymer is to be used as a corrosion-resistant material or as electrical insulation. For such purposes it is desirable for the process of this invention to use water-soluble ammonium electrolytes. For other reasons, it has been found to be desirable in one embodiment of this invention to employ sodium hydroxide as the electrolyte. Accordingly, this invention includes the use of ammonium hydroxide, ammonium carbonate, and sodium hydroxide as the electrolytes in this process.

The amount of electrolyte used in this invention depends on various factors of the reaction, although it generally is desirable to maintain the electrolyte concentration as small as possible, and yet within the operable range. It has been found convenient to relate the amount of electrolyte to the total weight of the dispersion. In the case of sodium hydroxide and of ammonium carbonate, 0.01% to 0.5% by weight of the dispersion has been found to be preferred in the concentration of a dispersion from about 30% solids to about 65% solids or more. In the case of concentrated ammonium hydroxide, 0.05% to 0.75% by weight of the dispersion constitutes the preferred amount. It is apparent that more dilute solutions of ammonium hydroxide might be used, in which event the amounts to be used would vary so as to provide amounts equivalent to those given above for the concentrated solution. As a general statement, it may be said that the electrolyte should be present in the amount of 0.01% to 1.0% by weight of the dispersion.

The temperature at which the concentrating action takes place should be from about 50° C. to about 80° C. The preferred range of temperature is from about 70° C. to about 80° C. Concentration may take place at lower temperatures, but in order to achieve the most speed and, thereby, to reduce costs, the temperatures should be those given above. The rate at which the original dispersion is heated to its concentrating temperature is unimportant in this process. Certain embodiments of this invention will permit concentrations of a desired degree to occur within 15 minutes, while other embodiments may require one or two hours. The rate of concentration is slow in the first minute or two of the heating period, increases to a rapid rate, and then tapers off to slower rates. It has also been found that, if the surface of the dispersion is large, evaporation and concentration will be effected quicker. For many applications of this invention, a heating period of 15 minutes to an hour is sufficient to increase the concentration of a polytetrafluoroethylene dispersion from an initial value of about 30% to a final concentration of 65% solids or more.

The non-ionic surface-active agent employed in this process is any of a group of polyethylene glycol ethers having the formula:

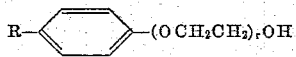

or $$C_nH_{2n\pm1}(OCH_2CH_2)_mOH$$

where R is a monovalent hydrocarbon radical of 8–10 carbon atoms, $r$ is a positive number having a value of 1–2 more than the number of carbon atoms in R, $n$ is a positive integer from 12–18, and $m$ is a positive number having a value from $$\frac{5n}{6}-6 \text{ to } \frac{2n}{3}+1$$

These agents are made by the condensation of a phenol or an alkanol with ethylene glycol. "Triton" X–100, one of the preferred surface-active agents of this invention, is a product made by Rohm and Haas Co. in which R is a tertiary octyl group and $r$ has a value of from 9–10. The products exemplified by the second of the above formulas may be made from a saturated long-chain alcohol or an alcohol having a double-bond unsaturation. The value of $r$ and of $m$ in the above formulas may not be whole numbers, and this is intended to cover the fact that any commercial compound might prove to be a mixture of compounds which differ only by the number of ethylene oxide units.

In order to understand the interaction of variables in this process, some explanation may be in order so that one may successfully employ this process. The amount of ammonium polyfluorocarboxylate, the amount and kind of non-ionic surface-active agent, the amount and kind of electrolyte, and the temperature of the concentration process are all important variables which must be balanced. For example, as one uses a non-ionic, surface-active agent with an increasingly larger number of ethylene oxide units, it may be necessary to increase the temperature of the concentration, to increase the amount of electrolyte, or to increase the amount of the surface-active agent in order to make the process operate in the most satisfactory manner. As another example, if one increases the amount of the surface-active agent used in the process, it may be necessary to decrease the amount of electrolyte or to decrease the temperature in order for the process to operate satisfactorily. Other interactions may be apparent to those skilled in the art.

The concentrated dispersions of this invention are useful for the casting of films, impregnating certain papers, textiles, glass-fiber materials, and felted materials, coating many kinds of fibrous substances, such as paper, textiles, and glass fibers and fabrics, and other uses which may be apparent to those skilled in the art.

We claim:

1. A process for concentrating aqueous, colloidal dispersions of polytetrafluoroethylene which consists essentially of the steps of (1) forming a mixture by adding to an aqueous colloidal dispersion of particles of polytetrafluoroethylene containing 30%–50% by weight of polymer solids and containing 0.2%–0.4%, based on the weight of said solids, of an ammonium polyfluorocarboxylate having 7–10 carbon atoms per molecule, 0.01% to 1.0% by weight of said dispersion of a member of the group consisting of sodium hydroxide, ammonium hydroxide, and ammonium carbonate, and 6%–12% by weight of said solids of a non-ionic surface-active agent selected from the group consisting of compounds having the formula

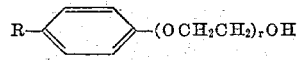

and compounds having the formula $$C_nH_{2n\pm1}(OCH_2CH_2)_mOH$$

wherein R is a monovalent hydrocarbon radical of 8–10 carbon atoms, $r$ is a positive number having a value equal to 1 to 2 more than the number of carbon atoms in R, $n$ is a positive integer of from 12–18, and $m$ is a number having the value of from $$\frac{5n}{6}-6 \text{ to } \frac{2n}{3}+1$$

(2) heating said mixture to a temperature of 50°–80° C. until said non-ionic, surface-active agent begins to insolubilize as indicated by a cloudy appearance in said mixture, and said particles settle to form in said mixture a lower layer containing the polymer solids and a substantially clear upper layer; (3) decanting said upper layer; (4) reducing the temperature of said mixture to about room temperature; and (5) recovering said lower layer as an aqueous colloidal dispersion of particles of polytetrafluoroethylene having a concentration of 55%–75% by weight of solids and being free of irreversibly coagulated polytetrafluoroethylene particles.

2. The process of claim 1 in which said non-ionic surface-active agent has the formula

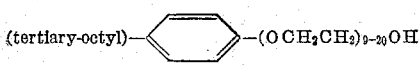

3. The process of claim 1 in which said non-ionic surface-active agent has the formula $$C_{12}H_{25}(OCH_2CH_2)_4OH$$

4. The process of claim 1 in which said non-ionic surface-active agent has the formula $$C_{18}H_{35}(OCH_2CH_2)_{10}OH$$

5. The process of claim 1 in which the ammonium hydroxide is employed in the amount of 0.05%–0.75% by weight of said dispersion.

References Cited in the file of this patent

UNITED STATES PATENTS

| | | |
|---|---|---|
| 2,478,229 | Berry | Aug. 9, 1949 |
| 2,559,752 | Berry | July 10, 1951 |

OTHER REFERENCES

"Industrial and Engineering Chemistry," volume 44, No. 8, pages 1800–1805, August 1952.

UNITED STATES PATENT OFFICE
CERTIFICATION OF CORRECTION

Patent No. 3,037,953              June 5, 1962

Barnard Mitchel Marks et al.

It is hereby certified that error appears in the above numbered patent requiring correction and that the said Letters Patent should read as corrected below.

Column 3, line 52, the formula should appear as shown below instead of as in the patent:

$$C_nH_{2n\pm 1}(OCH_2CH_2)_mOH$$

column 8, lines 73 to 75, the formula should appear as shown below instead of as in the patent:

Signed and sealed this 18th day of September 1962.

(SEAL)
Attest:

ERNEST W. SWIDER              DAVID L. LADD
Attesting Officer              Commissioner of Patents